Aug. 20, 1940.  J. RUSKAMP  2,212,303

VALVE

Filed Sept. 27, 1938

Joseph Ruskamp
INVENTOR.

BY *CA Brown & Co.*
ATTORNEYS.

Patented Aug. 20, 1940

2,212,303

UNITED STATES PATENT OFFICE 2,212,303

VALVE

Joseph Ruskamp, Dodge, Nebr.

Application September 27, 1938, Serial No. 231,987

1 Claim. (Cl. 137—104)

This invention relates to valve construction, and more particularly to valves of the float actuated type.

An important object of the invention is to provide a valve of this character comprising a body portion of a construction to insure a perfect seating of the valve, under varying degrees of pressure.

Another object of the invention is to provide a self balancing valve member mounted in such a way that the water pressure entering the tank in which the valve operates, will act to align the valve with its seat, to further insure the true seating of the valve.

A still further object of the invention is to provide a support for the valve which will increase the leverage of the valve actuating arms, with the result that the lengths of the valve operating arms and connecting links may be greatly reduced.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
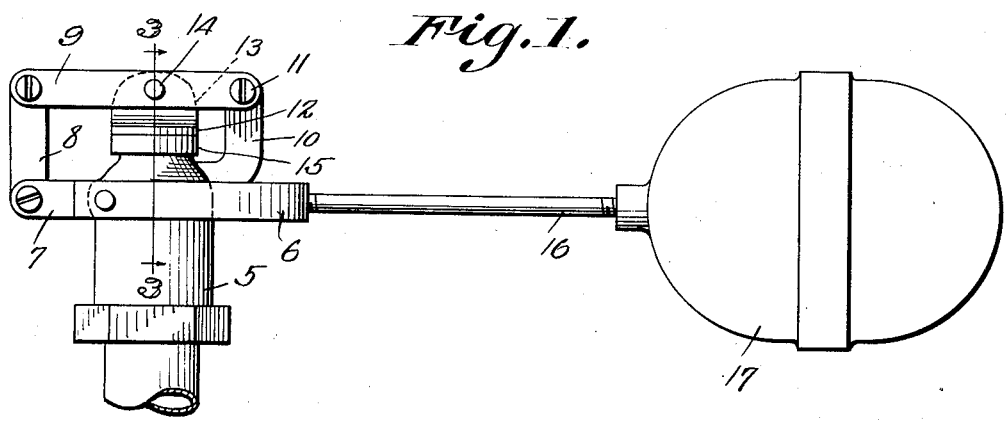
Figure 1 is a side elevational view of a float-actuated valve constructed in accordance with the invention.
Figure 2:
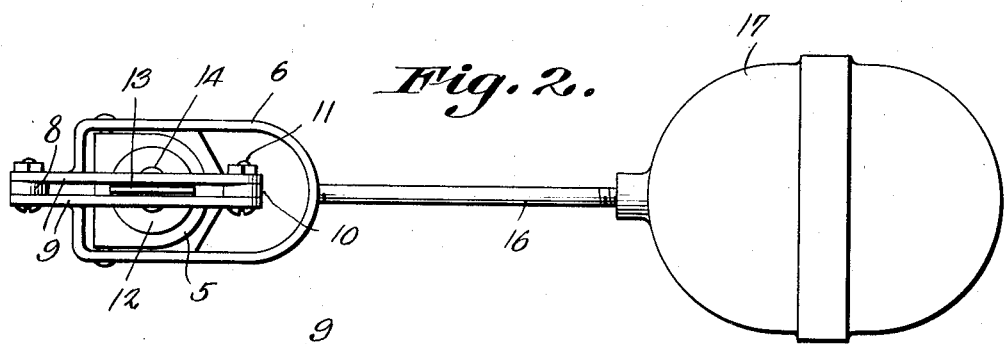
Figure 2 is a plan view thereof.
Figure 3:
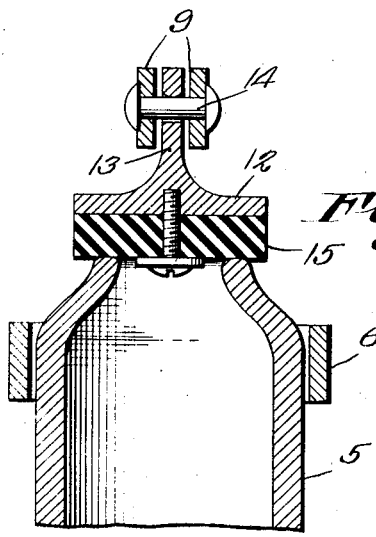
Figure 3 is a sectional view taken on line 3—3 of Figure 1.

Referring to the drawing in detail, the reference character 5 designates an inlet pipe through which water enters a tank or the like container. The discharge end of the pipe 5 is reduced, providing a valve seat.

Pivotally mounted on the inlet pipe 5, at a point directly below the reduced end thereof, is a yoke 6 that fits around the discharge end of the pipe, the yoke including spaced arms 7 between which the lower end of the link 8 is pivotally mounted. The upper end of the link 8 is pivotally mounted between the arms 9 that extend over the discharge end of the pipe 5, as clearly shown by Figure 1 of the drawing.

Extending upwardly from the inlet pipe 5, is an arm 10, to which the arms 9 are pivotally connected as at 11. The arms 9 provide the support for the valve base 12 having an upstanding wide extension 13 which is pivotally mounted between the arms 9, as by means of the pivot pin 14, the opening in the extension 13 being of a diameter to allow free pivotal movement of the valve with respect to the arms 9 to insure a true seating of the valve.

Mounted on the circular base 12, is a disk-like valve member 15 secured to the base by means of a screw. This valve member 15 is constructed preferably of rubber to insure a true seating of the valve to cut off the flow of water from the inlet pipe 5.

A threaded opening is formed in the yoke 6, into which one end of the rod 16 is threaded. The float 17 is secured to the free end of the rod 16 and operates to close the valve as the water level in the tank in which the valve is positioned, reaches its limit.

From the foregoing it will be seen that due to the construction shown and described, I have provided a self-balancing valve which will seat perfectly under varying degrees of pressure and one wherein the leverage of the valve actuating arms will be greatly increased to the end that the lengths of the arms of the valve actuating mechanism may be greatly reduced.

I claim:

A float-actuated valve including a tubular body portion having a reduced discharge end providing a valve seat, a yoke positioned over the body portion and pivotally connected thereto, a link pivotally connected to the yoke and extending upwardly beyond the end of the body portion, an upwardly extended arm connected with the inlet pipe, a pair of arms connecting the first mentioned link and said upwardly extended arm, said pair of arms normally lying in a horizontal position, a valve member, a wide extension rising from the valve member, said wide extension being pivotally mounted between said pair of arms, a disk-like valve mounted on the valve member and adapted to move into engagement with the reduced end of the body portion, for controlling the flow of water through the body portion, and a rod carrying a float, secured to said yoke.

JOSEPH RUSKAMP.